United States Patent [19]
Kenyon et al.

[11] Patent Number: 6,153,330
[45] Date of Patent: *Nov. 28, 2000

[54] ALKALINE MANGANESE DIOXIDE ELECTROCHEMICAL CELL HAVING COATED CAN TREATED WITH SILICON COMPOUNDS

[75] Inventors: Kenneth H. Kenyon, Verona; Joseph L. Passaniti, Middleton, both of Wis.

[73] Assignee: Rayovac Corporation, Madison, Wis.

[ * ] Notice: This patent is subject to a terminal disclaimer.

[21] Appl. No.: 09/127,086

[22] Filed: Jul. 31, 1998

Related U.S. Application Data

[63] Continuation-in-part of application No. 08/522,849, Sep. 1, 1995, Pat. No. 5,814,419.

[51] Int. Cl.[7] ............... H01M 6/08; H01M 2/02
[52] U.S. Cl. ............ 429/165; 429/176; 429/206; 220/62.15
[58] Field of Search ............... 429/176, 206, 429/165; 220/62.15

[56] References Cited

U.S. PATENT DOCUMENTS

| | | | |
|---|---|---|---|
| 3,066,179 | 11/1962 | Ruben | 136/83 |
| 3,156,749 | 11/1964 | Hosfield | 264/161 |
| 3,485,675 | 12/1969 | Ruben | 136/83 |
| 3,663,301 | 5/1972 | Ralston et al. | 136/107 |
| 3,764,392 | 10/1973 | Kuwazaki et al. | 136/107 |
| 3,770,505 | 11/1973 | Bergum et al. | 136/10 |
| 4,011,103 | 3/1977 | Kordesch | 429/66 |
| 4,060,670 | 11/1977 | Tamminen | 429/154 |
| 4,098,967 | 7/1978 | Biddick et al. | 429/210 |
| 5,447,809 | 9/1995 | Hafner et al. | 429/165 |
| 5,487,960 | 1/1996 | Tanaka | 429/218 |
| 5,527,641 | 6/1996 | Koshiishi et al. | 429/163 |
| 5,814,419 | 9/1998 | Kenyon et al. | 429/165 |

FOREIGN PATENT DOCUMENTS

| | | |
|---|---|---|
| 42-25145 | 12/1967 | Japan . |
| 52-112731 | 9/1977 | Japan . |
| 48361-1983 | 3/1983 | Japan . |
| 59-138069 | 8/1984 | Japan . |
| 59-146164 | 8/1984 | Japan . |

*Primary Examiner*—John S. Maples
*Attorney, Agent, or Firm*—Quarles & Brady LLP

[57] ABSTRACT

The performance characteristics of alkaline manganese dioxide cells are improved by applying a thin, polymeric coating to the inner surface of an unplated steel positive current collector, and including a silicon compound in the coating. The polymeric coating comprises, in combination, a first film forming binder component and a second component comprising an electrically conductive component such as carbon or a filler. The combination of the coating and the silicon compound reduces the internal resistance of the cell, and may be used on unplated steel.

13 Claims, No Drawings

ALKALINE MANGANESE DIOXIDE ELECTROCHEMICAL CELL HAVING COATED CAN TREATED WITH SILICON COMPOUNDS

CROSS-REFERENCE TO RELATED APPLICATIONS

This application is a continuation-in-part of application Ser. No. 08/522,849, filed Sep. 1, 1995, now U.S. Pat. No. 5,814,919 incorporated herein by reference in its entirety.

STATEMENT REGARDING FEDERALLY SPONSORED RESEARCH OR DEVELOPMENT

Not applicable.

BACKGROUND OF THE INVENTION

The invention relates to alkaline manganese dioxide electrochemical cells, and, in particular, to cells having a positive current collector, or can, comprising on its inner surface a resin that comprises a silicon compound. Cells prepared in accordance with the invention exhibit improved performance characteristics in high rate applications by reducing the high resistance between the cathode and the positive current collector.

Small primary electrochemical cells have been commercially available for more than a century. Originally, all small commercially available primary electrochemical cells and batteries were of the zinc carbon type. However, the need for a higher capacity primary battery system led to the development of alkaline batteries. These batteries typically use an alkaline electrolyte instead of ammonium chloride and zinc chloride dissolved in water. Within the last two decades alkaline electrochemical cells have become a tremendous commercial success. In fact, sales of alkaline batteries now exceed those of zinc carbon batteries in the United States.

The most commercially successful alkaline batteries have been cylindrical cells of the well known "AAA," "AA," "C" and "D" sizes. Generally, such alkaline cylindrical batteries comprise a cathode which is a mixture of manganese dioxide, $MnO_2$, and a carbonaceous material, typically graphite. In some cylindrical alkaline cells, this cathode mixture, which is often wetted with electrolyte, is compressed into annular rings. The cathode is placed into a metallic container which also serves as the positive current collector. Anodes of alkaline electrochemical cells usually comprise powdered zinc in some type of gel, usually carboxymethylcellulose. The anodic current collector, usually a brass pin, is placed in electrical contact with the anode. The anode and the cathode is of such alkaline cells are usually separated by a separator comprised of non-woven, inert fabric.

As with other electrochemical cell systems, a decrease in the internal cell resistance of alkaline electrochemical cells increases cell performance. It is generally agreed that much of the internal resistance in alkaline electrochemical cells results from contact resistance, i.e., poor electrical contact, between the cathode and the positive current collector and from the electrical resistance of the positive current collector. Consequently, it is desirous to provide for an alkaline electrochemical cell which has a positive current collector with low electrical resistance and good electrical connection between the positive current collector and the cathode.

One method of obtaining the desired electrical contact between the positive current collector and the cathode mix is to create high pressure at the interface between the two members. Hosfield, in U.S. Pat. No. 3,156,749, obtains high pressure contact through forming a cylindrical battery cathode by impact molding it within the current collector. High pressure contact can also be achieved by inserting annular rings of cathode mix into the positive current collector, which has an inside diameter less than the outside diameter of the cathode rings.

Even with good electrical connection realized through high pressure contact, it has been long recognized that contact resistance between the cathode and an untreated steel current collector causes a reduction in the performance of alkaline dry cell batteries. This resistance, which is known to increase during storage especially at high temperatures, is believed to be a function of the amount of oxide formed at the cathode-current collector interface. It is believed that the alkaline electrolyte reacts with the surface of the current collector to form a solid oxide.

A number of solutions to this increased resistance, e.g. oxide formation, have been suggested. For example, Ruben, in U.S. Pat. No. 3,066,179, taught that by applying a thin coat of gold to a steel current collector, the resistance between the cathode mix and the current collector would be markedly decreased since oxide formation would be minimized. In U.S. Pat. No. 3,485,675, Ruben suggested a surface carburized layer on the steel. Again, the solution taught by Ruben decreased the amount of oxide formed at the cathode-current collector interface. Moreover, both solutions taught by Ruben supplied the surface of the current collector with a continuous layer of a material which approximated the conductivity of bare metal. However, with the price of gold at least ten times greater today than when Ruben proposed its use as a coating for the current collector and the well-known expense and difficulty of obtaining a carburized surface layer on steel, other ways of reducing contact resistance in alkaline electrochemical cells are needed.

To avoid the expensive solutions for reducing the contact resistance between the cathode mix and the positive current collector proposed by Ruben, in Japanese Patent Publication No. 42-25145, Uchida et al. proposed coating the entire inner surface of the positive current collector with a graphite laden synthetic resin. However, since it is well known that placing any material which is less electrically conductive than steel between the cathode mix and the positive current collector increases the electrical resistance of the current collector (and graphite is at least one order of magnitude less conductive than steel and most synthetic resins are orders of magnitude less conductive than steel), the '145 reference proposes using substantial amounts of graphite in the resin. In a similar teaching, Shinoda et al. disclose in Japanese Patent Publication No. 48361-1983 a resinous coating having a high amount of carbonaceous material, wherein the coating contains between 50 and 70 weight percent carbon, and the coating is disposed over the entire inner surface of the positive current collector.

The amounts of carbon proposed for use in the synthetic resins by the Japanese references are so high that it is very unlikely that the resinous coatings disclosed therein would adhere to a positive current collector well enough for further processing. Moreover, even if the coatings did adhere to a metal current collector, they would probably lack sufficient mechanical integrity to remain attached thereto. For example, a small mechanical shock, such as placing a battery in a device, might cause the coating to become dislodged from the metal current collector. Moreover, both references disclose coatings disposed continuously over the entire inner surface of the positive current collector, thereby making the manufacture of cells according to those inventions a slow and expensive process. Consequently, the problems inherent with such large amounts of carbon in a dry coating, together with the requirement that the coating be continuous, cause the search for a more complete solution to the problem to continue.

While all of the aforementioned solutions have been attempted, the present commercial solution involves plating a steel current collector with nickel. While less expensive than plating a surface with gold or providing such a surface with a carburized layer, nickel plating has been found to be an expensive solution to the problem of decreasing contact resistance, without increasing internal cell resistance. Nickel plating of steel has been though to be of such importance that some battery manufacturers have used resinous coatings such as were disclosed in the aforementioned Japanese references on nickel plated steel current collectors. (It is interesting to note that the aforementioned Japanese references do not propose using the various resins on unplated steel current collectors.) Consequently, the ability to use a steel current collector without providing for an expensive to apply continuous surface layer has long been sought by the manufacturers of alkaline electrochemical cells.

BRIEF SUMMARY OF THE INVENTION

In a first aspect, the invention is an alkaline electrochemical cell having a positive current collector that comprises an steel can having directly on an inner surface thereof a conductive polymeric coating comprises a silicon compound. The steel can can be nickel-plated or unplated. The silicon compound can be, but is not limited to, silica, silicic acid (hydrated silica, $SiO_2 \cdot XH_2O$), an alkali metal silicate or metasilicate, or another silicon compound that reacts to form an alkali metal silicate or metasilicate, or mixtures thereof (collectively, "the silicon compounds") in the presence of an alkali hydroxide. The cathode of a cell of the present invention may additionally contain a metal alkali silicate.

A cell comprising one or more of the silicon compounds in a thin conductive coating on the inner surfaces of the can exhibits reduced internal resistance relative to cells lacking such a coating. The coating apparently prevents the formation of a high-resistance layer between the cathode and the positive current collector, even during storage at elevated temperatures.

In a second aspect, the silicon compound is added to the conductive polymeric resin when in its liquid form, and the treated resin is provided on the can surfaces. Upon drying the resin becomes the thin conductive coating.

In any embodiment of the invention, an alkali metal silicate may also be included in the cathode of the cell.

The electrochemical cell and method of making an electrochemical cell of the invention have certain objects. That is, the invention provides solutions to problems existing in the prior art. For example, the invention provides an electrochemical cell and method of making same that: (a) provides improved performance on intermittent and continuous discharge; (b) provides longer life and greater capacity, and (c) reduces corrosion of the inner surface of the can.

The invention can provide certain advantages, including lower manufacturing costs relative to conventional nickel-plated cans (when the can is not nickel-plated), an environmentally safe method of treating the cans, and the ease with which it may be implemented.

Other objects, feature and advantages of the present invention will become more fully apparent from the following detailed description, taken in conjunction with the accompanying drawings.

BRIEF DESCRIPTION OF THE SEVERAL VIEWS OF THE DRAWINGS

Not applicable.

DETAILED DESCRIPTION OF THE INVENTION

U.S. Pat. No. 5,447,809, issued Sep. 5, 1995 and entitled "Alkaline Primary Battery Containing Coated Current Collector," the disclosure of which is hereby incorporated by reference in its entirety, describes an unplated steel container for a primary alkaline cell where the container is coated on its inner surface to reduce corrosion. U.S. Pat. No. 5,447,809 does not contemplate including silica in the coating.

LR20 (D size) and LR14 (C size) cells and methods for making such cells are described in U.S. Pat. No. 5,607,796, incorporated herein by reference in its entirety. LR20 and LR14 type cells have container cans of larger diameter than those employed in 814 and 813 type cells. Cathode rings for LR20 and LR14 type cells are prepared with initial diameters smaller than that of container. In LR20 and LR14 type cells, cathode rings are loosely placed inside the container, and then forced to conform to the inner diameter of the container through a combination of a downward force being applied to the top surface of the topmost ring, and a rod of fixed outer diameter being disposed the central aperture of the rings while the downward force is being applied. The process of inserting and forming the cathode rings in the containers of LR20 and LR14 type cells causes the container to stretch and expand somewhat.

In LR20 and LR14 type cells, a multilayer adhesive label is placed directly about the container, and this is to be considered preferred in a cell produced according to the invention because this construction permits the steel container to have a greater diameter, and thus increases the amount of interior volume available to house electrochemical active anode and cathode material. As a result, the preferred embodiment of the invention provides an electrochemical cell having greater electrical charge capacity. Some of the foregoing multilayer adhesive labels have adhesives that inhibit the corrosion of the exterior surface of the unplated steel container. More particularly, it was discovered that the exterior surfaces of unplated steel containers did not rust appreciably when exposed to high temperature (113° F.), high humidity (90% relative humidity) storage conditions for more than a year when multilayer adhesive layers had been applied thereto. The following U.S. patents, all entitled "Multilayer Adhesive Label" and hereby incorporated by reference in their respective entireties, describe multilayer adhesive labels finding particular advantageous application in the present invention: U.S. Pat. Nos. 4,810,514; 7,911,994; 5,032,477; 5,262,251; 5,312,712; 5,326,654; and 5,358,804.

When LR20 and LR14 type primary alkaline electrochemical cells having the coating described in prior U.S. Pat.

No. 5,447,809 (without a silicon compound in the coating) were examined after storage for one month at an elevated temperature of 130° F., certain corrosion problems were noted. The inner surfaces of the cans were corroded, and the coatings applied to the inner surfaces of the cans were peeling off. These observations indicated that accelerated corrosion occurred on the inner can surfaces of the cans in LR20 and LR14 type cells when compared to older cells.

It is suspected that the aggressive cathode ring consolidation and formation process used in LR20 and LR14 type cells may cause small cracks to form in the coating disposed on the inner surfaces of container 2. Those cracks, in turn, may permit electrolyte access to more fresh, uncoated, unplated steel surfaces than would otherwise be possible. As a result, corrosion may be accelerated, and the internal resistance of the cell increases as the degree of corrosion of the inner surface of container 2 increases.

These issues can be addressed by adding to the coating of U.S. Pat. No. 5,447,809 a silicon compound which can, without limitation, be silica, silicic acid (hydrated silica, $SiO_2 \cdot XH_2O$), an alkali metal silicate or metasilicate, or another silicon compound that reacts to form an alkali metal silicate or metasilicate in the presence of an alkali hydroxide, or a combination of silicon compounds. A preferred amount of the silicon compound is 1–2% by weight of the coating.

As used in the specification, the terms alkali metal silicate and alkali metal metasilicate may be used interchangeably. Moreover, the term "alkali metal silicate" as used in the specification and claims hereof includes, but it not limited to, a substance defined variously as (1) a gray white silica-containing powder soluble in alkalis and water and insoluble in alcohol and acids; (2) sodium or potassium metasilicate; (3) sodium or potassium metasilicate pentahydrate; (4) sodium or potassium silicate pentahydrate; (5) soluble glass; (6) water glass; (7) silicate of soda, and (8) silicic acid.

The inventors have determined that, among the silicon compounds, a preferred silicon compound is silica. When silica is provided in the coating and the coating is applied directly to the unplated metal can in accordance with the present invention, corrosion is reduced and high-rate performance is enhanced. The silica is advantageously provided in the coating even when no chromate film is provided on the surface of the can, as is required in U.S. Pat. No. 5,527,641 (Koshiishi, et al.). There is no suggestion in Koshiishi of any advantageous use of silica additive in a coating that does not overlay a chromate layer.

It is not known why adding silica to the coating improves cell performance, although it is thought that silica may improve coating viscosity or flow characteristics, thereby facilitating the application process, or silica may itself form corrosion-inhibiting potassium silicate when it dissolves in the potassium hydroxide electrolyte. From a processing standpoint, silica is preferred for its ease of dispersion in the resin. Cells prepared according to the invention typically take more than twice as long as control cells to reach a preselected discharge endpoint, and the performance enhancement can be 25-fold or more, in certain tests, as is shown in the accompanying Examples.

The present invention can be employed not only among primary alkaline cells, but also among rechargeable alkaline cells.

EXAMPLES

Several examples of the utility of the present invention will now be explained. U.S. Pat. No. 5,447,809 fully describes how to make and use the basic coatings used herein, except for the addition of silica. Accordingly, those aspects are not recapitulated herein in their entirety. U.S. Pat. No. 5,814,419, (incorporated herein by reference), describes the inclusion of silicon compounds other than silica in a conductive polymeric coating. Accordingly, the disclosure of that patent application is not recapitulated herein.

The resins ("paints") were a premixed liquid carbonaceous electrically conductive mixture comprising carbon black, PVC and the solvent methyl ethyl ketone. The paints to which the silica was added were CARBON BLACK 50-882-082™ (RBH Dispersions, Inc. of Bound Brook, New Jersey) or Mavidon-995 (Mavidon Corp., Palm City, Fla.), as noted, which resins are substantially the same with regard to function and chemical composition. In the Examples, fine silica (Cabosil) was added to between 1% and 2% by weight in the above-mentioned paints. Control paints were not treated with silica.

The unplated steel cans of the Examples were manufactured by Central States Can of Massilon, Ohio, and were formed from tin mill 91 lb. T-2 temper 5C finish Type L black plate steel.

The paints were sprayed on the inner surfaces of unplated steel cans for about 2 seconds with a liquid solution of coating material into the interior of each can with a spray nozzle operating at about 100–300 psi and the cans spinning at about 1900–2200 rpm. The cans were then dried in an oven for three to five minutes at 200° F. It was discovered that the optimal weight amount of coating to apply to the cans was about 45–55 milligrams per can, where the weight amount was measured after the coating had dried. After the coatings dried, remaining cell components were placed in the treated cans to form complete, operative cells.

In the Examples, and unless noted otherwise, the cathodes of all cells were made using a standard cathode mix formulation comprising 87% by weight electrolytic manganese dioxide, 9.7% by weight graphite, 3.3% electrolyte composed of 36.7% potassium hydroxide, 3.8% zinc oxide, and 59.5% water.

Example 1

As is noted in the accompanying Table 1, silica was added in the indicated amount (by weight percent) to the indicated coating, which in these examples can also be Mavidon-995™ which is substantially the same in function and composition as CARBON BLACK 50-882-082™ (RBH Dispersions, Inc. of Bound Brook, New Jersey).

Table 1 demonstrates that when silica is incorporated into the coating, appreciable increases in closed circuit voltage and amps are observed after either one month or two months of storage at high temperature, relative to cells that lack silica in the coating of the cans. An improvement was particularly noted when 2% silica was combined with CARBON BLACK 50-882-082™ from RBH Dispersions, Inc. with a PVC binder.

TABLE 1

Open Circuit Voltage (OCV) and Closed Circuit Voltage (CCV) and Short Circuit Current (Amps) in primary cells comprising cans having silica-containing inner coating after storage at high temperature

| Paint Type<br>Binder<br>Polymer<br>% Added SiO2 | RBH Control<br>Paint<br>Poly Vinyl<br>chloride<br>0% | Control RBH +<br>SiO2<br>Poly Vinyl<br>Chloride<br>2% | | Mavidon-995<br><br>Acrylic<br>0% | Mavidon-995 +<br>SiO2<br><br>Acrylic<br>1% | |
|---|---|---|---|---|---|---|
| | Value | Value | % Gain | Value | Value | % Gain |
| Initial | | | | | | |
| OCV | 1.609 | 1.609 | 0% | 1.609 | 1.609 | 0% |
| CCV | 1.504 | 1.501 | 0% | 1.505 | 1.504 | 0% |
| Amps | 20.26 | 20.08 | −1% | 20.41 | 20.75 | 2% |
| 4 Wk/130° F. | | | | | | |
| OCV | 1.603 | 1.602 | 0% | 1.600 | 1.601 | 0% |
| CCV | 1.288 | 1.403 | 9% | 1.313 | 1.451 | 11% |
| Amps | 8.80 | 12.46 | 42% | 9.83 | 16.04 | 63% |
| 8 Wk/130° F. | | | | | | |
| OCV | 1.594 | 1.594 | 0% | 1.592 | 1.586 | 0% |
| CCV | 0.950 | 1.303 | 37% | 1.071 | 1.255 | 17% |
| Amps | 5.18 | 10.46 | 102% | 6.78 | 8.53 | 26% |

Example 2

As is shown in the accompanying tables, the cells prepared according to Example 1 were tested in ANSI and high-rate tests as shown below, either immediately after production or after storage for one month at high temperature. The results demonstrate that while no appreciable performance change is noted immediately after production (Table 2), after one month the cells that include silica in the can coating discharge to 1.10 volts much longer than comparably stored control cells lacking the silica (Table 3).

The greatest performance improvement is observed in high rate discharge tests, and at higher end voltages.

TABLE 2

Initial Discharge Performance

| Paint Type<br>% added SiO$_2$ | RBH Control<br>Paint<br>0% | Control RBH +<br>SiO2<br>2% | | Mavidon-995<br><br>0% | Mavidon-995 +<br>SiO2<br>1% | |
|---|---|---|---|---|---|---|
| Initial<br>Discharge<br>Performance | Value | Value | % Gain | Value | Value | % Gain |
| 1 Amp, Cont | 4 | 13 | | 4 | 5 | |
| No. in Data Set | 3.4 | 3.1 | −8% | 3.5 | 3.5 | −1% |
| Hours to 1.10 V | 8.4 | 8.1 | −4% | 8.5 | 8.4 | −1% |
| Hours to 0.80 V | | | | | | |
| 1 Ohms Cont | 5 | 15 | | 5 | 5 | |
| No. in Data Set | 2.4 | 2.8 | 16% | 2.6 | 2.3 | −9% |
| Hours to 1.10 V | 8.4 | 8.6 | 3% | 8.6 | 8.5 | −1% |
| Hours to 0.80 V | | | | | | |
| 1.5Ω 4m/15m-8 h/d | 5 | 15 | | 5 | 5 | |
| No. in Data Set | 7.3 | 7.6 | 4% | 9.3 | 9.6 | 3% |
| Hours to 1.10 V | 15.5 | 15.6 | 1% | 14.3 | 14.2 | −1% |
| Hours to 0.80 V | | | | | | |
| 2.2 Ohms Cont | 5 | 15 | | 5 | 5 | |
| No. in Data Set | 12.0 | 12.0 | 0% | 12.3 | 12.2 | −1% |
| Hours to 1.10 V | 22.7 | 22.7 | 0% | 23.2 | 23.0 | −1% |
| Hours to 0.80 V | | | | | | |
| 2.2 Ohms 1H/D | 5 | 15 | | 5 | 5 | |
| No. in Data Set | 12.9 | 12.6 | −2% | 13.3 | 12.9 | −3% |
| Hours to 1.10 V | 25.0 | 24.6 | −2% | 25.1 | 24.8 | −1% |
| Hours to 0.80 V | | | | | | |
| 3.9 Ohms 1H/D | 5 | 15 | | 5 | 5 | |
| No. in Data Set | 32.5 | 32.8 | 1% | 32.7 | 32.6 | 0% |
| Hours to 1.10 V | 43.2 | 43.4 | 1% | 43.9 | 43.5 | −1% |
| Hours to 0.90 V | | | | | | |

TABLE 2-continued

Initial Discharge Performance

| Paint Type<br>% added SiO$_2$ | RBH Control<br>Paint<br>0% | Control RBH +<br>SiO2<br>2% | | Mavidon-995<br>0% | Mavidon-995 +<br>SiO2<br>1% | |
| --- | --- | --- | --- | --- | --- | --- |
| Initial<br>Discharge<br>Performance | Value | Value | % Gain | Value | Value | % Gain |
| 10 Ohms 4H/D | 5 | 15 | | 5 | | |
| No. in Data Set | 100 | 101 | 1% | 100 | | |
| Hours to 1.10 V | 125 | 126 | 1% | 125 | | |
| Hours to 0.90 V | | | | | | |

TABLE 3

Discharge Performance after 1 mo/130 F.

| Paint Type<br>% added SiO2 | RBH Control<br>Paint<br>0% | Control RBH +<br>SiO2<br>2% | | Mavidon-995<br>0% | Mavidon-995 +<br>SiO2<br>1% | |
| --- | --- | --- | --- | --- | --- | --- |
| Discharge after<br>1 Month/130° F. | Value | Value | % Gain | Value | Value | % Gain |
| 1 Amp, Cont | 3 | 15 | | 3 | 4 | |
| No. in Data Set | 0.2 | 1.2 | 594% | 0.1 | 1.3 | 2560% |
| Hours to 1.10 V | 6.6 | 7.3 | 11% | 6.3 | 7.0 | 12% |
| Hours to 0.80 V | | | | | | |
| 1 Ohms Cont | 4 | 13 | | 3 | 4 | |
| No. in Data Set | 0.1 | 0.7 | 721% | 0.1 | 0.8 | 600% |
| Hours to 1.10 V | 8.4 | 8.3 | −2% | 8.4 | 7.8 | −7% |
| Hours to 0.80 V | | | | | | |
| 1.5Ω 4m/15m-8<br>h/d | 4 | 15 | | 3 | 4 | |
| No. in Data Set | 4.5 | 5.4 | 20% | 0.6 | 5.3 | 727% |
| Hours to 1.10 V | 14.9 | 13.6 | −9% | 12.5 | 13.8 | 10% |
| Hours to 0.80 V | | | | | | |
| 2.2 Ohms Cont | 4 | 15 | | 5 | 5 | |
| No. in Data Set | 8.7 | 10.0 | 14% | 2.4 | 10.0 | 315% |
| Hours to 1.10 V | 22.4 | 21.9 | −2% | 22.7 | 21.7 | −4% |
| Hours to 0.80 V | | | | | | |
| 2.2 Ohms 1H/D | 5 | 15 | | | 5 | |
| No. in Data Set | 12.0 | 11.3 | −5% | | 11.5 | |
| Hours to 1.10 V | 24.2 | 24.1 | −1% | | 23.4 | |
| Hours to 0.80 V | | | | | | |
| 3.9 Ohms 1H/D | 5 | 15 | | 5 | 5 | |
| No. in Data Set | 31.0 | 29.9 | −4% | 28.0 | 30.0 | 7% |
| Hours to 1.10 V | 42.9 | 41.3 | −4% | 43.1 | 42.1 | −3%b |
| Hours to 0.90 V | | | | | | |
| 10 Ohms 4H/D | 5 | 15 | | 5 | | |
| No. in Data Set | 100 | 99 | −1% | 100 | | |
| Hours to 1.10 V | 126 | 124 | −2% | 126 | | |
| Hours to 0.90 V | | | | | | |

From the results in the foregoing examples and the referenced drawings and tables, it is evident that the alkaline cells of this invention are superior to conventional alkaline batteries in their ability to resist corrosion and retain superior performance after storage at high temperature. Although certain preferred embodiments of the present invention have been described, the spirit and scope of the invention are by no means restricted to what is described above.

For example, the present invention includes within its scope alkaline electrochemical cells having sodium silicate or silicic acid treated coated cans, where the cathodes additionally contain sodium silicate. The present invention also includes within its scope primary and rechargeable alkaline manganese dioxide electrochemical cells.

Those skilled in the art will appreciate readily that many modifications are possible in the exemplary embodiments without materially departing from the novel teachings and advantages of this invention. Accordingly, all such modifications are intended to be included within the scope of this invention as defined in the following claims.

We claim:

1. An alkaline electrochemical cell, comprising:

(a) a cylindrical steel container having an inner surface, a closed first end forming a bottom, an initially open second end, and upstanding sidewalls having an outer surface, the container forming a positive current collector;

(b) a cylindrical annular cathode disposed within the container and comprising manganese dioxide, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a seal disposed over the top of the initially open second end; the negative current collector extending through the seal, and (h) a conductive polymeric coating comprising a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container, the coating being disposed directly on the inner surface of the container and comprising a silicon compound selected from the group consisting of silica, silicic acid, an alkali metal silicate or metasilicate, and a silicon compound that reacts to form an alkali metal silicate or metasilicate in the presence of an alkali hydroxide; wherein the cell delivers higher amperage in respect of another cell having otherwise identical construction but having no silicon compound in the coating disposed on the inner surface of its container.

2. The cell of claim 1 wherein the silicon compound is silica.

3. The cell of claim 1, wherein the cathode additionally comprises sodium silicate.

4. The cell of claim 1, wherein the cathode additionally comprises silicic acid.

5. The cell of claim 1, wherein the cell is a primary electrochemical cell.

6. The cell of claim 1, wherein the cell is a rechargeable electrochemical cell.

7. The cell of claim 1, wherein the cell is one of the AAA, AA, C and D sizes.

8. The cell of claim 1, wherein the steel container is unplated.

9. A cylindrical steel container having an inner surface, a closed first end forming a bottom, an initially open second end, and upstanding sidewalls, and comprising on the inner surface a conductive polymeric coating comprising a first film forming binder component and a second component comprising at least one of electrically conductive carbon and an electrically conductive filler, the film forming component of the coating being resistant to chemical reaction with an alkaline electrolyte, the coating being disposed directly on the inner surface and comprising a silicon compound selected from the group consisting of silica, silicic acid, an alkali metal silicate or metasilicate, and a silicon compound that reacts to form an alkali metal silicate or metasilicate in the presence of an alkali hydroxide.

10. The container of claim 9, wherein the silicon compound is silica.

11. The container of claim 9, wherein the container is unplated.

12. An alkaline electrochemical cell, comprising:

(a) a cylindrical steel container having an inner surface, a closed first end forming a bottom, an initially open second end, and upstanding sidewalls having an outer surface, the container forming a positive current collector;

(b) a cylindrical annular cathode disposed within the container and comprising manganese dioxide and sodium silicate, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a seal disposed over the top of the initially open second end; the negative current collector extending through the seal, and (h) a conductive polymeric coating comprising a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container, the coating comprising a silicon compound; wherein the cell delivers higher amperage in respect of another cell having otherwise identical construction but having no silicon compound in the coating disposed on the inner surface of its container.

13. An alkaline electrochemical cell, comprising:

(a) a cylindrical steel container having an inner surface, a closed first end forming a bottom, an initially open second end, and upstanding sidewalls having an outer surface, the container forming a positive current collector;

(b) a cylindrical annular cathode disposed within the container and comprising manganese dioxide and silicic acid, the cathode having outer peripheral sidewalls and inner peripheral sidewalls, the inner peripheral sidewalls forming a central cylindrically shaped void disposed therebetween;

(c) a cylindrical anode having an outer peripheral surface and comprising gelled zinc, the anode being disposed within the central cylindrically shaped void;

(d) an ionically permeable separator interposed between at least a portion of the outer peripheral surface of the anode and the inner peripheral sidewalls of the cathode;

(e) an alkaline aqueous electrolyte comprising potassium hydroxide, the electrolyte at least partially wetting the anode, the cathode, and the separator;

(f) a negative current collector electrically connected to the anode;

(g) a seal disposed over the top of the initially open second end; the negative current collector extending through the seal, and (h) a conductive polymeric coating comprising a first film forming binder component and a second component comprising at least one of electrically conductive carbon and an electrically conductive filler, the film forming component of the coating being resistant to chemical reaction with the alkaline electrolyte, the coating being interposed between, and being in electrical contact with, both the outer peripheral sidewalls of the cathode and the inner surface of the container, the coating comprising a silicon compound;

wherein the cell delivers higher amperage in respect of another cell having otherwise identical construction but having no silicon compound in the coating disposed on the inner surface of its container.

* * * * *